(12) United States Patent
Mito

(10) Patent No.: US 11,107,439 B2
(45) Date of Patent: Aug. 31, 2021

(54) IMAGE PROCESSING APPARATUS, METHOD OF CONTROLLING IMAGE PROCESSING APPARATUS, AND STORAGE MEDIUM

(71) Applicant: CANON KABUSHIKI KAISHA, Tokyo (JP)

(72) Inventor: Koji Mito, Koza-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/296,084

(22) Filed: Mar. 7, 2019

(65) Prior Publication Data

US 2019/0279598 A1   Sep. 12, 2019

(30) Foreign Application Priority Data

Mar. 12, 2018  (JP) .............................. JP2018-044354

(51) Int. Cl.
*G09G 5/02* (2006.01)
*H04N 17/02* (2006.01)
*H04N 1/60* (2006.01)
*H04N 1/62* (2006.01)
*H04N 9/67* (2006.01)

(52) U.S. Cl.
CPC ............. *G09G 5/02* (2013.01); *H04N 1/6058* (2013.01); *H04N 1/622* (2013.01); *H04N 9/67* (2013.01); *H04N 17/02* (2013.01); *G09G 2320/0666* (2013.01); *G09G 2354/00* (2013.01); *G09G 2360/144* (2013.01)

(58) Field of Classification Search
CPC ............... G09G 5/02; G09G 2360/144; G09G 2354/00; G09G 2320/0666; H04N 9/67; H04N 1/622; H04N 1/6058; H04N 17/02; H04N 9/64
See application file for complete search history.

(56) References Cited

U.S. PATENT DOCUMENTS

2003/0103057 A1    6/2003  Graves
2003/0234880 A1*  12/2003  Fukui ................... H04N 1/6058
                                                               348/272

(Continued)

FOREIGN PATENT DOCUMENTS

CN    101291438 A    10/2008
CN    102833555 A    12/2012
(Continued)

*Primary Examiner* — Kee M Tung
*Assistant Examiner* — Khoa Vu
(74) *Attorney, Agent, or Firm* — Canon U.S.A., Inc. IP Division

(57) ABSTRACT

An image processing apparatus includes a first setting unit configured to set a target range of a luminance level, and a generation unit configured to generate a processed image by performing image processing on a first region of an image in such a manner that the first region is distinguished from a second region and a third region, the first region having a luminance level included in the target range and having a color not included in a target color gamut, the second region having a luminance level not included in the target range and having a color not included in the target color gamut, and the third region having a luminance level not included in the target range and having a color included in the target color gamut.

18 Claims, 12 Drawing Sheets

(56) References Cited

U.S. PATENT DOCUMENTS

| | | | |
|---|---|---|---|
| 2010/0296731 A1* | 11/2010 | Mizukura | H04N 1/6058 |
| | | | 382/167 |
| 2013/0335457 A1* | 12/2013 | Yano | G09G 3/3208 |
| | | | 345/690 |
| 2017/0061594 A1* | 3/2017 | Suzuki | G06T 5/009 |
| 2017/0061848 A1* | 3/2017 | Nakagoshi | G06T 7/90 |
| 2017/0237962 A1* | 8/2017 | Oh | H04N 7/08 |
| | | | 348/474 |
| 2018/0109850 A1* | 4/2018 | Tsukagoshi | H04N 19/46 |
| 2018/0322679 A1* | 11/2018 | Kunkel | H04N 21/4122 |
| 2020/0013151 A1* | 1/2020 | Atkins | G06T 5/009 |

FOREIGN PATENT DOCUMENTS

| | | |
|---|---|---|
| CN | 106488078 A | 3/2017 |
| EP | 1383345 A2 | 1/2004 |
| EP | 2073561 A1 | 6/2009 |
| EP | 3136379 A1 | 3/2017 |
| JP | 2004-260284 A | 9/2004 |
| JP | 2005-12802 A | 1/2005 |

\* cited by examiner

FIG.3A

| DETERMINATION CONDITION (COLOR GAMUT) SETTING | Rec.709 |
|---|---|
| | DCI |
| | Native |

FIG.3B

| DETERMINATION CONDITION (COLOR GAMUT) SETTING | R | x | | 0.64 |
| | | y | | 0.33 |
| | G | x | | 0.30 |
| | | y | | 0.60 |
| | B | x | | 0.15 |
| | | y | | 0.06 |

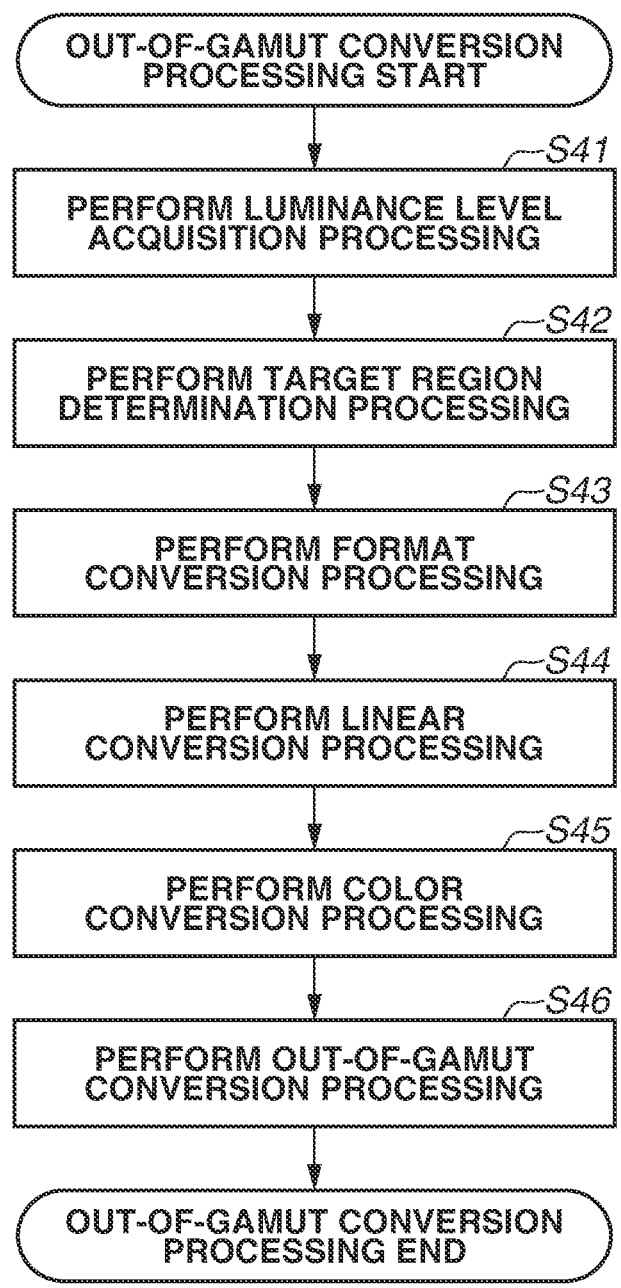

IMAGE PROCESSING APPARATUS, METHOD OF CONTROLLING IMAGE PROCESSING APPARATUS, AND STORAGE MEDIUM

BACKGROUND OF THE INVENTION

Field of the Invention

The present invention relates to an image processing apparatus that performs predetermined image processing on a region outside a predetermined color gamut in an input image, a method of controlling the image processing apparatus, and a storage medium.

Description of the Related Art

A color gamut that can be displayed by a display apparatus is sometimes narrower than a color gamut of image data. In a case where a display apparatus displays an image based on the image data that includes a color gamut wider than the displayable color gamut, the color gamut of the image data is converted into a color gamut (conversion color gamut) corresponding to the displayable color gamut. In the conversion, a pixel in which a color outside the conversion color gamut (out of color gamut) in the color gamut of the image data is designated is displayed in a saturated state.

In such a case, it is difficult for a user to verify whether a region where a color outside the color gamut is designated has been included in the image data, by checking the image displayed on the display apparatus.

A display apparatus discussed in Japanese Patent Application Laid-Open No. 2005-12802 converts a color of a pixel outside a gamut in input image data into a specific color, and displays the resultant image.

SUMMARY OF THE INVENTION

According to an aspect of the present invention, an image processing apparatus includes a first setting unit configured to set a target range of a luminance level, and a generation unit configured to generate a processed image by performing image processing on a first region of an image in such a manner that the first region is distinguished from a second region and a third region, the first region having a luminance level included in the target range and having a color not included in a target color gamut, the second region having a luminance level not included in the target range and having a color not included in the target color gamut, and the third region having a luminance level not included in the target range and having a color included in the target color gamut.

Further features of the present invention will become apparent from the following description of embodiments with reference to the attached drawings.

BRIEF DESCRIPTION OF THE DRAWINGS

FIGS. 3A and 3B are schematic diagrams each illustrating a graphical user interface (GUI) that is used to set a determination condition.

FIG. 9 is a fourth flowchart illustrating an out-of-gamut conversion processing.

DESCRIPTION OF THE EMBODIMENTS

Some embodiments of the present invention are described below with reference to drawings. The technical scope of the present invention is defined by claims, and is not limited by the embodiments described below. Further, all combinations of characteristics described in the embodiments are not necessarily essential for the present invention. Contents described in the present specification and the drawings are illustrative and should not be construed as limiting the present invention. Various modifications can be made within the scope of the present invention, and the modifications are not excluded from the technical scope of the present invention. In other words, combined configurations of the embodiments and the modifications are all included in the present invention.

A first embodiment of the present invention will be described below. A description will be given of a display apparatus that includes an image processing apparatus according to the present embodiment. The image processing apparatus may be provided separately from the display apparatus. Examples of the image processing apparatus provided separately from the display apparatus include a personal computer (PC), a reproduction apparatus (e.g., Blu-ray player), and a server apparatus. In addition, a program that is read by a processor included in the PC to execute the following control, and a storage medium that stores the program are also included in the present invention.

Figure 1:
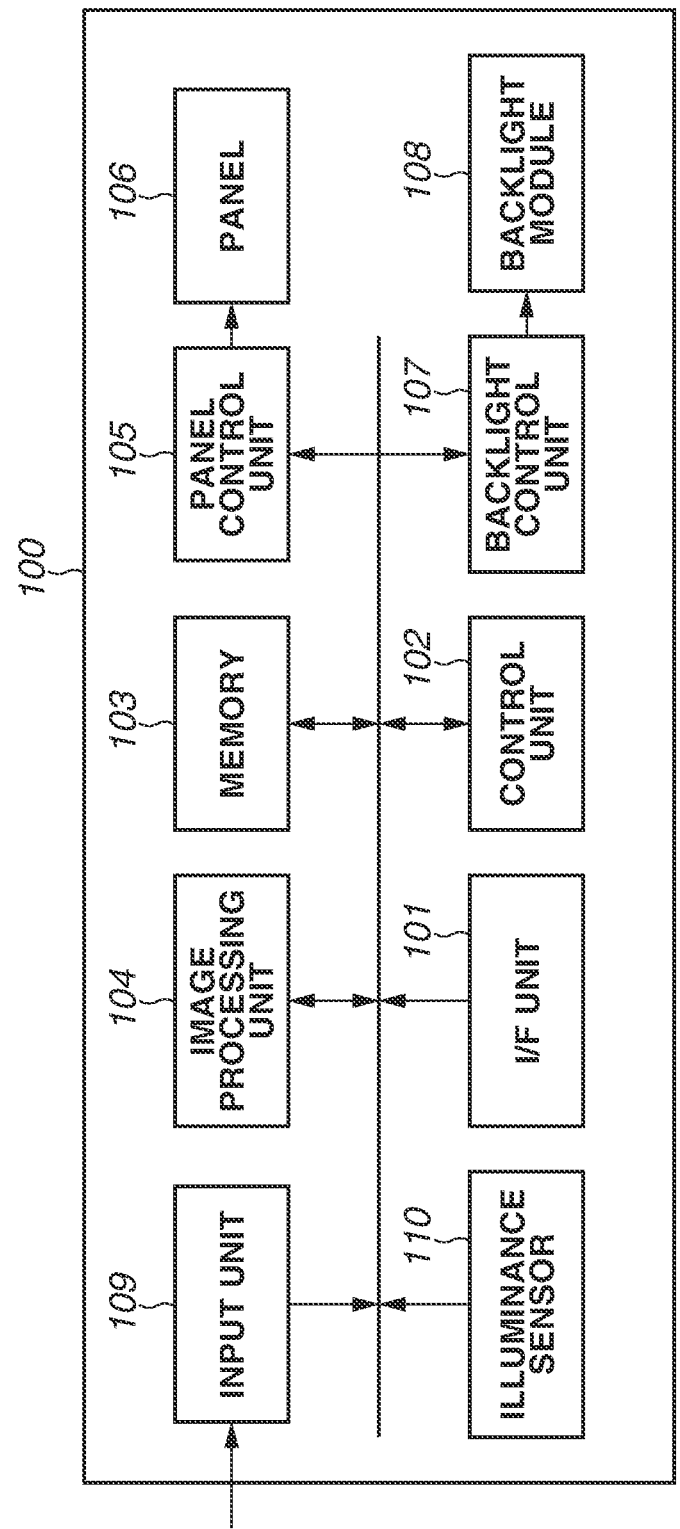
FIG. 1 is a block diagram illustrating functional blocks of a display apparatus.

FIG. 1 is a block diagram illustrating functional blocs of a display apparatus 100. The display apparatus 100 includes an interface (I/F) unit 101, a control unit 102, a memory 103, an image processing unit 104, a panel control unit 105, a panel 106, a backlight control unit 107, a backlight module 108, an input unit 109, and an illuminance sensor 110.

The I/F unit 101 is a user interface that allows the user to change a setting value of the display apparatus 100 and a conversion mode described below. The I/F unit 101 is an receiving unit which receives a user operation. For example, the I/F unit 101 is a button switch, and the user operates the I/F unit 101 based on a graphical user interface (GUI) displayed on a screen of the display apparatus 100, to input an instruction.

The control unit 102 is a processor that controls operation of each of the functional blocks. The control unit 102 is, for example, a central processing unit (CPU). The control unit 102 controls transmission/reception of a parameter to control operation of each of the functional blocks and image data.

The memory 103 is a storage medium storing parameters and programs that are used for processing by the control unit 102 and the other functional blocks. The control unit 102 executes a program read out from the memory 103 to control operation of each of the functional blocks. In addition, the memory 103 may store image data.

The image processing unit 104 converts image data input to the display apparatus 100 based on the setting value designated by the user, and outputs the converted image data to the panel control unit 105.

The panel control unit 105 controls the panel 106 to display the image based on the converted image data output from the image processing unit 104.

The panel 106 is a liquid crystal display panel that displays an image on a screen under the control of the panel control unit 105.

The backlight control unit 107 adjusts luminance of a light emitting diode (LED) configuring the backlight module 108, under pulse width modulation (PWM) control. A duty ratio of the PWM control is calculated by the control unit 102.

The backlight module 108 is a light source that emits light from a rear surface of the panel 106. The panel control unit 105, the panel 106, the backlight control unit 107, and the backlight module 108 are included in a display module. The display module may include, for example, an organic electroluminescent (EL) display module including a plurality of organic EL devices and a driving unit thereof, in place of the panel control unit 105, the panel 106, the backlight control unit 107, and the backlight module 108.

The input unit 109 is an acquisition unit acquiring image data from an external apparatus.

The illuminance sensor 110 is a sensor that outputs an output value relating to illuminance of environment (illuminance of environmental light) where the display apparatus 100 is placed.

Figure 2:
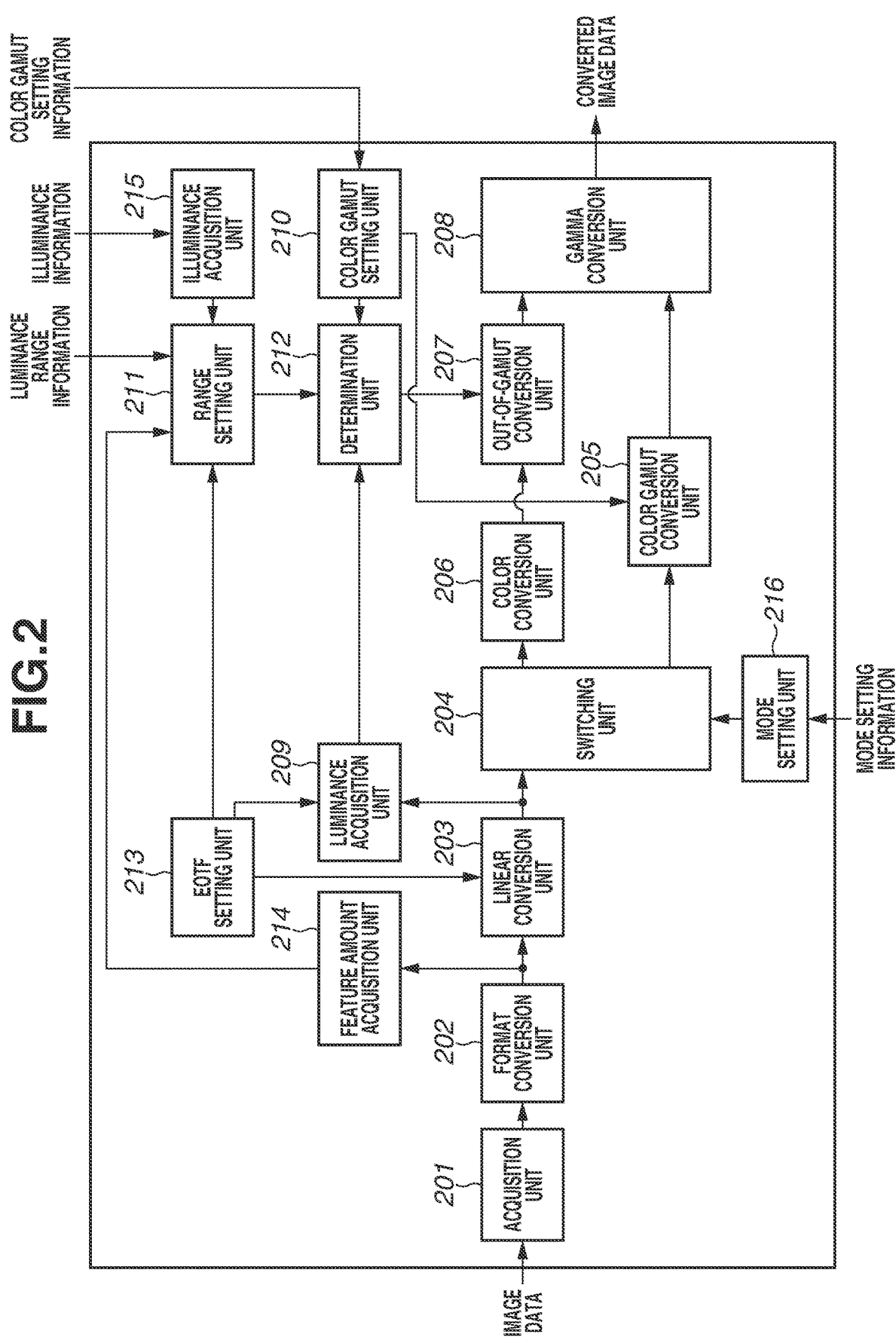
FIG. 2 is a block diagram illustrating functional blocks of an image processing unit.

FIG. 2 is a block diagram illustrating functional blocks of the image processing unit 104. The image processing unit 104 can operate in a first conversion mode. In the first conversion mode, the image processing unit 104 converts a color gamut of the input image data into a set color gamut and outputs the resultant image data. In addition, the image processing unit 104 can operate in a second conversion mode. In the second conversion mode, the image processing unit 104 performs conversion in such a manner that, in the input image data, a region that has a luminance level included in a set target range and has a color not included in the set color gamut is distinguishable from other region of the image data, and outputs the resultant image data. Further, the image processing unit 104 can operate in a third conversion mode. In the third conversion mode, the image processing unit 104 performs conversion in such a manner that, in the input image data, a region that has the color not included in the set color gamut is distinguishable from other region of the image data irrespective of the set target range, and outputs the resultant image data. According the present embodiment, the target range is narrower than a range where the luminance level of the input image data is covered. For example, the target range is a range excluding a range where the luminance level is lower (darker) than a set lower limit, in the range where the luminance level of the input image data is covered. Further, the target range may be a range excluding a range where the luminance level is higher (brighter) than a set upper limit, in the range where the luminance level of the input image data is covered.

The image processing unit 104 includes an acquisition unit 201, a format conversion unit 202, a linear conversion unit 203, a switching unit 204, a color gamut conversion unit 205, a color conversion unit 206, an out-of-gamut conversion unit 207, and a gamma conversion unit 208. The image processing unit 104 further includes a luminance acquisition unit 209, a color gamut setting unit 210, a range setting unit 211, a determination unit 212, an electro optical transfer function (EOTF) setting unit 213, a feature amount acquisition unit 214, an illuminance acquisition unit 215, and a mode setting unit 216. The EOTF setting unit 213, the feature amount acquisition unit 214, and the illuminance acquisition unit 215 are not used in control of the display apparatus 100 according to the first embodiment. Therefore, detailed description of these units will be described below.

The acquisition unit 201 acquires image data under the control of the control unit 102. The acquisition unit 201 may acquire image data from an external apparatus via the input unit 109. Alternatively, the acquisition unit 201 may acquire image data by reading the image data stored in the memory 103. The acquisition unit 201 outputs the acquired image data to the format conversion unit 202.

The format conversion unit 202 converts a signal format of the image data input to the display apparatus 100 into an RGB format, and outputs the resultant image data to the linear conversion unit 203.

The linear conversion unit 203 converts a color space of the image data, which has the signal format converted into the RGB format by the format conversion unit 202, into a linear color space. The conversion into the linear color space is performed by, for example, application of EOTF. The EOTF is a transfer function or gradation characteristics representing relationship between a signal level and display luminance, etc. of light. In a case where the image data includes perceptual quantization (PQ) characteristics defined by International Telecommunication Union-Radiocommunication Sector (ITU-R) BT.2100, the EOTF is represented by the following expression:

$$m1 = \frac{2610}{16384}, \quad (1)$$
$$m2 = \frac{2523}{4096} \times 128$$
$$c1 = \frac{3424}{4096},$$
$$c2 = \frac{2413}{4096} \times 32,$$
$$c3 = \frac{2392}{4096} \times 32$$
$$Vout = \left(\frac{\text{Max}(Vin^{\frac{1}{m2}} - c1, 0)}{c2 - c3 \times Vin^{\frac{1}{m2}}}\right)^{\frac{1}{m1}},$$

where Vin is a value obtained by normalizing the image data, which has the signal format converted into the RGB format by the format conversion unit 202, to 0 to 1. Further, in Expression 1, Max(a, b) is a function to select the maximum value of values a and b.

The switching unit 204 switches a functional block to which the image data acquired from the linear conversion unit 203 is output, between the color gamut conversion unit 205 and the color conversion unit 206, based on the conversion mode set by the mode setting unit 216. The switching unit 204 outputs the image data to the color gamut conversion unit 205 in a case where the first mode in which the image data is converted into the image data of the set color gamut is set. The switching unit 204 outputs the image data to the color conversion unit 206 in a case where the second conversion mode is set.

The color gamut conversion unit 205 converts a color gamut of the image data, which has the color space converted into the linear color space by the linear conversion unit 203, into the set color gamut, and outputs the converted image data. For example, according to the present embodiment, the color gamut of the image data is Rec.2020, and the set color gamut is Rec.709. Rec.709 indicates a color gamut conforming to Recommendation ITU-R BT.709 standard defined for high definition television (HDTV) by ITU-R. Rec. 2020 indicates a color gamut conforming to Recommendation ITU-R BT.2020 standard defined for next-generation ultrahigh-definition television (UHDTV) by ITU-R. The color gamut of the image data and the color gamut settable as the color gamut after conversion are not limited to the above-described example.

According to the present embodiment, the color gamut is converted according to the following expression:

$$\begin{bmatrix} Rtmp \\ Gtmp \\ Btmp \end{bmatrix} = \begin{bmatrix} 1.1658 & -0.5853 & -0.0725 \\ -0.1249 & 1.1332 & -0.0083 \\ -0.0182 & -0.1006 & 1.1188 \end{bmatrix} \begin{bmatrix} Rin \\ Gin \\ Bin \end{bmatrix} \quad (2)$$

$Rout = \text{Max}(\text{Min}(Rtmp, 0), 1)$ $Gout = \text{Max}(\text{Min}(Gtmp, 0), 1)$ $Bout = \text{Max}(\text{Min}(Btmp, 0), 1)$ where Rin, Gin, and Bin are respectively an R value, a G value, and a B value of each of pixels of the input image data. Further, 3×3 matrix in Expression 2 is a conversion matrix that converts the RGB values of the color gamut of Rec.2020 into RGB values of the color gamut of Rec.709. Max(a, b) in Expression 2 is a function to select the maximum value of the values a and b, and Min(a, b) is a function to select the minimum value of the values a and b.

The color conversion unit 206 performs monochrome conversion processing for converting the image data, which has the color space converted into the linear color space by the linear conversion unit 203, from color into monochrome. The conversion into monochrome is performed according to, for example, the following expression:

$$\begin{bmatrix} Rout \\ Gout \\ Bout \end{bmatrix} = \begin{bmatrix} 0.2632 & 0.6776 & 0.0592 \\ 0.2632 & 0.6776 & 0.0592 \\ 0.2632 & 0.6776 & 0.0592 \end{bmatrix} \begin{bmatrix} Rin \\ Gin \\ Bin \end{bmatrix} \quad (3)$$

where Rin, Gin, and Bin are respectively the R value, the G value, and the B value of each of the pixels of the input image data. Further, 3×3 matrix in Expression 3 is a conversion matrix that converts each of the RGB values of the color gamut of Rec.2020 into a Y value of a XYZ color space. The 3×3 matrix in Expression 3 is not limited to the conversion matrix that converts each of the RGB values into the Y value of the XYZ color space, and may be other conversion matrix such as a conversion matrix that converts each of the RGB values into a Y value of a YCbCr color space or an I value of an ICtCp color space.

The out-of-gamut conversion unit 207 performs conversion processing for converting a pixel value of a pixel included in a target region of the input image data, into a value corresponding to a specific color. The target region has a luminance level that is determined to be included in the set target range, and has a color that is determined to be not included in the set color gamut, by the determination unit 212 described below. For example, in a case where the specific color is red, the pixel value of the pixel included in the target region is replaced with a value represented by the following expression:

$Rout = 1$ $Gout = 0$ $Bout = 0.$ \quad (4)

In a region other than the target region, the pixel value is converted into a value corresponding to a color at least other than the specific color (monochrome). Accordingly, by the processing of the out-of-gamut conversion unit 207, the target region and other region of the image data are converted to be distinguishable from each other.

The gamma conversion unit 208 converts gamma characteristics of the converted image data acquired from the color gamut conversion unit 205 or the out-of-gamut conversion unit 207, into gamma characteristics of the panel 106. In a case where the gamma characteristics of the panel 106 are represented by $V^\gamma$ (V is input value from 0 to 1), the gamma characteristics are converted according to the following expression:

$Vout = Vin^{1/\gamma}$ \quad (5)

where Vin is a value obtained by normalizing the image data, which has the signal format converted into the RGB format by the format conversion unit 202, to 0 to 1, similar to Expression 1.

The luminance acquisition unit 209 converts the RGB values of the image data, which has the signal format converted into the RGB format by the format conversion unit 202, into a luminance value (luminance level). The luminance value is the Y value of the YCbCr color space, and for example, the luminance acquisition unit 209 converts the RGB values of the image data into the Y value according to the following expression:

$$Y = \begin{bmatrix} 0.2627 & 0.678 & 0.0593 \end{bmatrix} \begin{bmatrix} Rin \\ Gin \\ Bin \end{bmatrix}. \quad (6)$$

The luminance value is not limited to the Y value of the YCbCr color space. The luminance value may be, for example, the I value of the ICtCp color space or an average value of the RGB values In Expression 6, 1×3 matrix is a conversion matrix that converts the RGB values into the Y value of the YCbCr color space.

The color gamut setting unit 210 sets a condition (determination condition) to determine a region outside the color gamut of the image data by the determination unit 212 described below. The determination condition is set through, for example, designation of the color gamut. FIGS. 3A and 3B are schematic diagrams each illustrating a GUI displayed to set the determination condition. A menu screen illustrated in FIG. 3A is displayed on a screen of the display module, and the user selects and sets the determination condition via the I/F unit 101. In a case where "Rec.709" is selected in FIG. 3A, the image data outside the color gamut of Rec.709 is determined as out of the color gamut. As illustrated in FIG. 3B, the xy values of each of the RGB colors may be designated to designate the color gamut as the determination condition. Further, in a case where the image processing unit 104 operates in a color gamut conversion mode described below, a target color gamut into which the color gamut of the acquired image data is converted is settable.

Figure 4A:
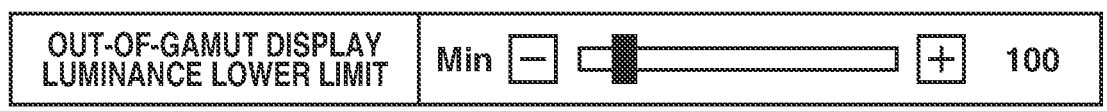
FIGS. 4A to 4C are schematic diagrams each illustrating a GUI that is used to set a target range.
Figure 4B:
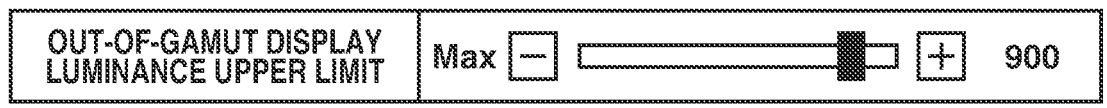
Figure 4C:
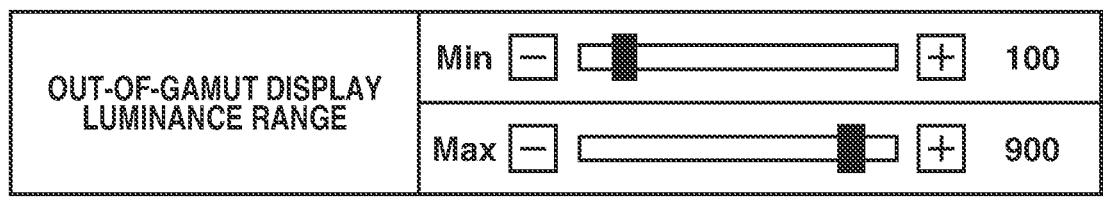

The range setting unit 211 sets a target range of the luminance level that is used by the determination unit 212 to determine the target region. The target range can be set by the user via the I/F unit 101. FIGS. 4A to 4C are schematic diagrams each illustrating a GUI used by the user to set the target range. The user operates a button on a slide bar to designate at least one of an upper limit and a lower limit of the target range. While, in the example of FIGS. 4A, 4B, and 4C, a luminance threshold is designated by a 10-bit integer, the range setting unit 211 uses the luminance threshold after normalizing the luminance threshold to a range of the luminance value calculated by the luminance acquisition unit 209.

FIG. 4A illustrates a GUI in a case where the user designates the lower limit of the target range. In this case, the luminance range where the luminance value is 100 or more in 10-bit conversion is the target range. FIG. 4B illustrates a GUI in a case where the user designates the upper limit of the target range. In this case, the luminance range where the luminance value is 900 or less in 10-bit conversion is the target range. FIG. 4C illustrates a GUI in a case where the user designates the lower limit and the upper limit of the target range. In this case, the luminance range where the luminance value is 100 or more and 900 or less in 10-bit conversion is the target range.

The determination unit 212 determines a target region that has the luminance level included in the target range and has the color not included in the set color gamut, in the image data which has the color space converted into the linear color space by the linear conversion unit 203. The determination unit 212 determines the target region based on the determination condition set by the color gamut setting unit 210, the luminance value of the image data calculated by the luminance acquisition unit 209, and the target range set by the range setting unit 211. The determination of the target region by the determination unit 212 is executed in a case where the second conversion mode is selected.

Figure 5:
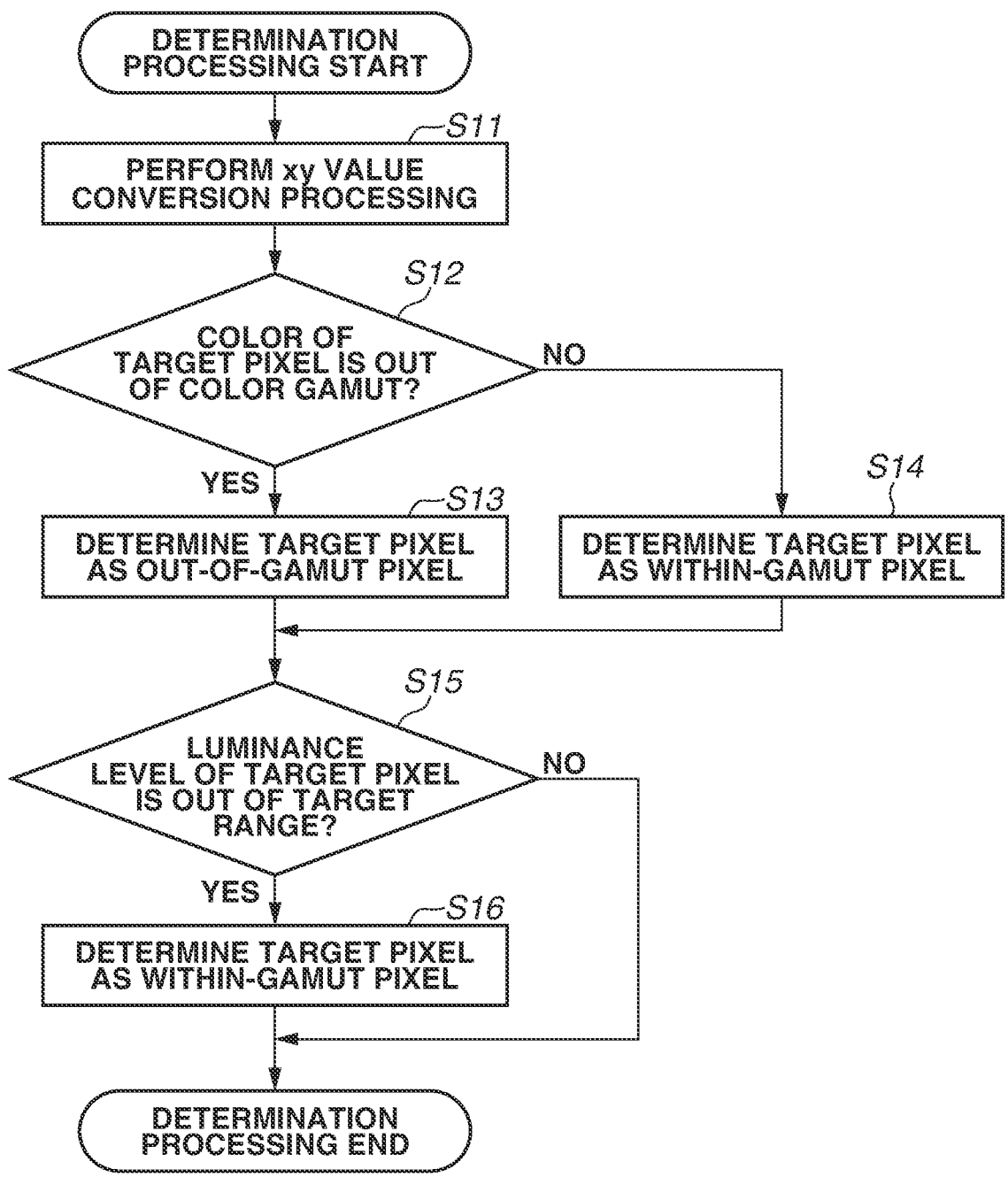
FIG. 5 is a first flowchart illustrating processing for determining a target region by a determination unit.

FIG. 5 is a flowchart illustrating the processing for determining the target region by the determination unit 212. The processing procedure is performed on each pixel of the acquired image data, and is repeatedly performed until the determination processing on all of pixels is completed.

In step S11, the determination unit 212 converts a color of the target pixel into the xy values. In a case where the color gamut of the image data, which has the color space converted into the linear color space (RGB) by the linear conversion unit 203 is Rec.2020, the determination unit 212 converts the color of the target pixel into the xy values according to the following expression:

$$\begin{bmatrix} X \\ Y \\ Z \end{bmatrix} = \begin{bmatrix} 0.6381 & 0.1445 & 0.1687 \\ 0.2631 & 0.6776 & 0.0592 \\ 0.0000 & 0.0280 & 1.0601 \end{bmatrix} \begin{bmatrix} Rin \\ Gin \\ Bin \end{bmatrix} \quad (7)$$

$$x = \frac{X}{X+Y+Z}$$

$$y = \frac{Y}{X+Y+Z}$$

where Rin, Gin, and Bin are RGB values of the image data which has the color space converted into the linear color space by the linear conversion unit 203. Further, in Expression 7, 3×3 matrix is a conversion matrix to convert the RGB values of the color gamut of Rec.2020 into XYZ values.

In step S12, the determination unit 212 determines whether the color of the target pixel converted in step S11 satisfies the set determination condition. In other words, the determination unit 212 determines whether the color of the target pixel is out of the color gamut. In a case where the xy values of the target pixel t are [xt, yt] and the set color gamut is Rec.709, the determination unit 212 determines that the color of the target pixel t satisfying any of conditions in the following expression is out of the color gamut.

$$yt > -0.7941xt + 0.8382$$

$$yt < 0.5510xt - 0.0226$$

$$yt > 3.6xt - 0.48 \quad (8)$$

Figure 6A:
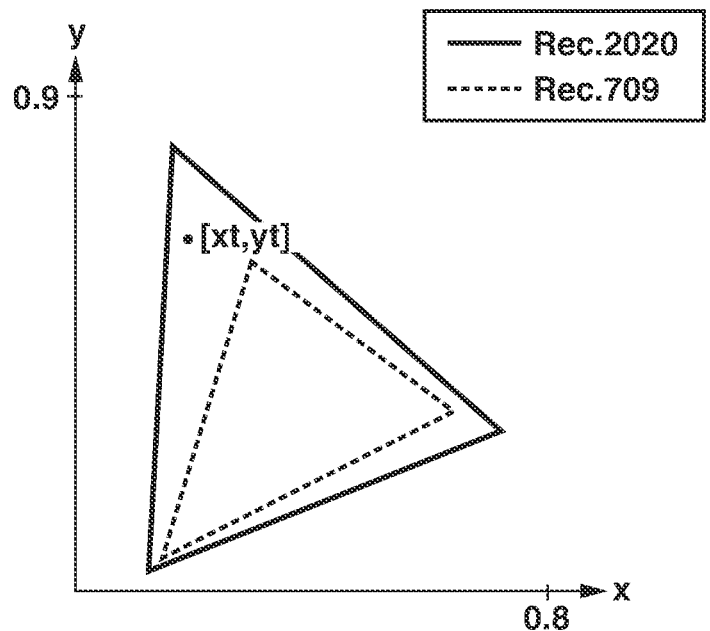
FIGS. 6A and 6B are schematic diagrams each illustrating a color gamut in an xy chromaticity diagram and xy values of a target pixel t.
Figure 6B:
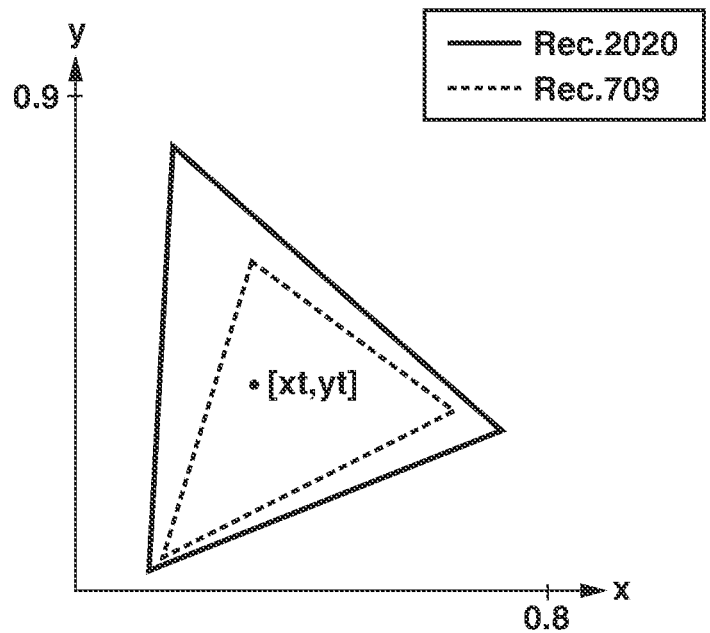

In a case where it is determined in step S12 that the xy values of the target pixel t is not included in the set color gamut (YES in step S12), the determination unit 212 determines the target pixel t as an out-of-gamut pixel in step S13. FIGS. 6A and 6B are schematic diagrams each illustrating the color gamut in an xy chromaticity diagram and the xy values of the target pixel t. An inside triangle indicates the color gamut defined by Rec.709, and an outside triangle indicates the color gamut defined by Rec.2020. As illustrated in FIG. 6A, in a case where the xy values [xt, yt] of the target pixel t are located outside the color gamut of Rec. 709, the determination unit 212 determines the target pixel t as the out-of-gamut pixel.

In a case where it is determined in step S12 that the xy values of the target pixel t is included in the set color gamut (NO in step S12), the determination unit 212 determines the target pixel t as a within-gamut pixel in step S14. As illustrated in FIG. 6B, in a case where the xy values [xt, yt] of the target pixel t are located inside the color gamut of Rec.709, the determination unit 212 determines the target pixel t as the within-gamut pixel. The inside of the color gamut includes a boundary of the color gamut.

In step S15, the determination unit 212 compares the luminance value of each of the pixels of the image data acquired by the luminance acquisition unit 209 and the target range set by the range setting unit 211, to determine whether the luminance value of the target pixel t is included in the target range.

In a case where the luminance value of the target pixel t is not included in the target range (YES in step S15), the target pixel t is determined as the within-gamut pixel in step S16. In other words, even in the case where the target pixel t has been determined as the out-of-gamut pixel in step S13, the target pixel t is determined as the within-gamut pixel by the determination in step S15. As a result, in the case where the luminance value of the target pixel t is not included in the target range, the out-of-gamut conversion unit 207 does not perform the conversion processing into a specific color on the target pixel t irrespective of whether the color of the target pixel t is included in the set color gamut. After the processing in step S16 is performed, the determination processing on the target pixel t ends.

In a case where it is determined in step S15 that the luminance value of the target pixel t is included in the target range (NO in step S15), the determination processing on the target pixel t ends. In other words, the result of the determination whether the color of the target pixel t is out of the color gamut determined based on the determination result in step S12 is maintained.

The region (target region) that has the luminance level included in the target range and has the color not included in the color gamut, and the other region (non-target region) are determined in the image data by performing the above-described processing on all of the pixels of the image data.

In the determination processing, the processing for determining whether the color of the target pixel is included in the set color gamut in step S12 and the processing for determining whether the luminance level of the target pixel is included in the target range in step S15 are exchangeable. The determination unit 212 may perform the processing for determining whether the luminance level of the target pixel is included in the target range, and may perform the processing for determining whether the color of the target pixel is included in the set color gamut only in a case where it is determined that the luminance level is included in the target range.

In this case, in the case where it is determined that the luminance level of the target pixel is included in the target range and the color of the target pixel is not included in the set color gamut, the target pixel is determined as the out-of-gamut pixel. In addition, in a case where it is determined that the luminance level of the target pixel is not included in the target range or in a case where it is determined that the luminance level of the target pixel is included in the target range and the color of the target pixel is included in the set color gamut, the target pixel is determined as the within-gamut pixel.

The determination processing is not limited to the above-described processing in which the processing procedure is performed on pixel by pixel. Alternatively, the above-described processing may be performed on all of the pixels of the image data. The processing for determining the target region by the determination unit 212 ends through the above-described steps.

The processing of the determination unit 212 is not limited to the above-described processing as long as the determination is performed in such a manner that the out-of-gamut conversion unit 207 can distinguish the target region that has the luminance level included in the target region and has the color not included in the set color gamut from the non-target region in the image data.

The mode setting unit 216 sets the operation mode of the color gamut conversion based on the instruction input by the user via the I/F unit 101. The mode setting unit 216 can set any of a plurality of operation modes including the color gamut conversion mode and an out-of-gamut display mode, as the operation mode. The color gamut conversion mode is an operation mode in which the color gamut of the acquired image data is converted into the set color gamut to generate the converted image data. The out-of-gamut display mode is an operation mode in which the conversion is performed in such a manner that the region that has the luminance level included in the set target range and has the color not included in the set color gamut is distinguishable from the other region in the acquired image data, to generate the converted image data.

Figure 7:
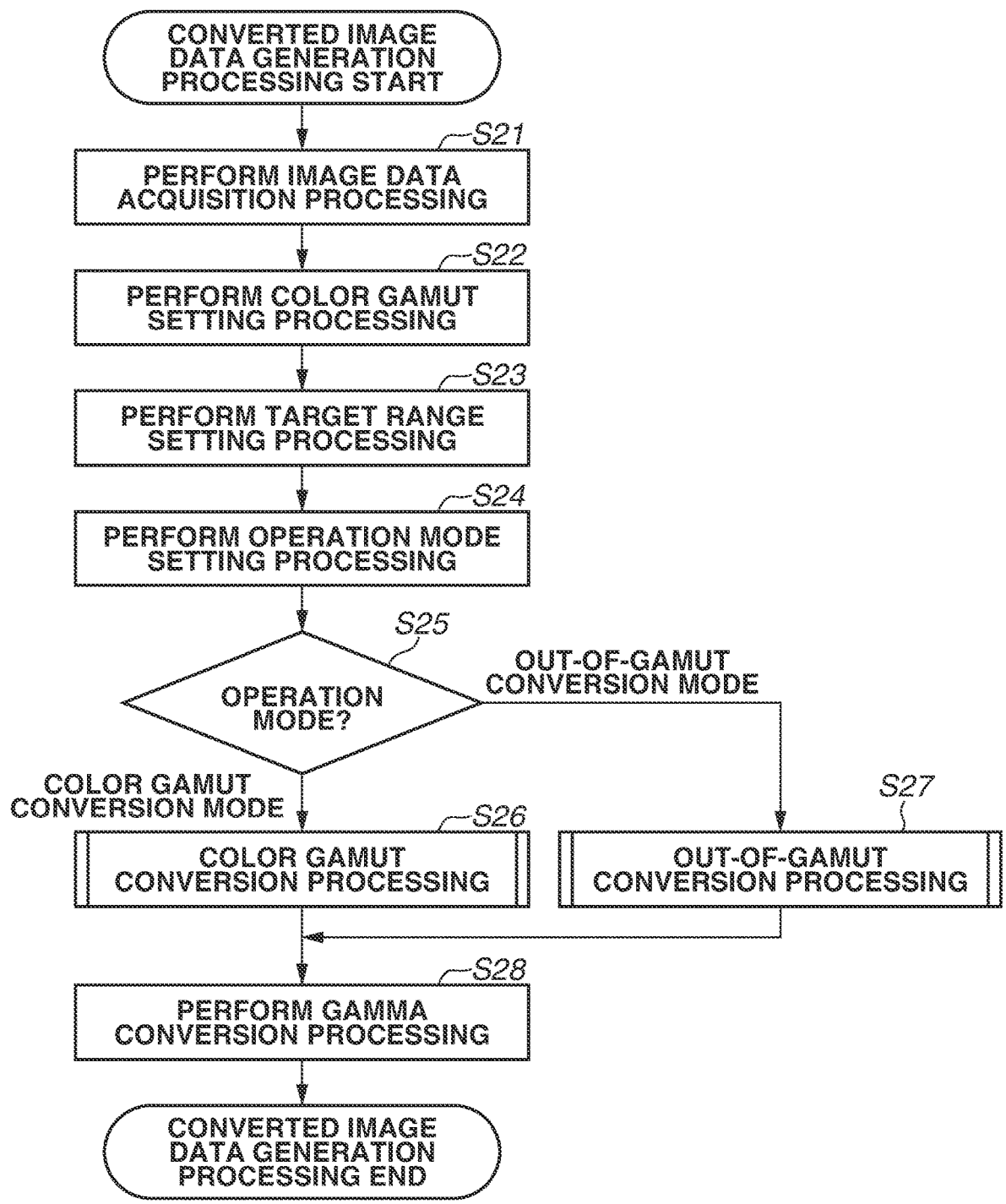
FIG. 7 is a second flowchart illustrating flow of processing for generating converted image data by an image processing unit.

FIG. 7 is a flowchart illustrating processing procedure for generating the converted image data by the image processing unit 104 according to the first embodiment. The execution of the processing procedure is started when the display apparatus 100 is turned on.

In step S21, the acquisition unit 201 executes processing for acquiring the image data. The acquisition unit 201 acquires the image data having the color gamut corresponding to Rec.2020.

In step S22, the color gamut setting unit 210 sets the conversion color gamut. For example, the conversion color gamut is set via display of the GUI illustrated in FIGS. 3A and 3B by the user selecting the color gamut.

In step S23, the range setting unit 211 sets the target range. For example, the GUI illustrated in FIG. 4A is displayed, and the user operates the slide bar to set the lower limit of the target range. As a result, the target range is set to the input range. The user may set the target range after the out-of-gamut display mode is selected.

In step S24, the mode setting unit 216 sets the operation mode. The operation mode is set by the user operating a not-illustrated GUI.

In step S25, the switching unit 204 switches an output destination of the image data acquired from the linear conversion unit 203, based on the set operation mode. In a case where the color gamut conversion mode is set, the switching unit 204 outputs the image data to the color gamut conversion unit 205, and the processing proceeds to color gamut conversion processing in step S26. In a case where the out-of-gamut conversion mode is set, the switching unit 204 outputs the image data to the color conversion unit 206, and the processing proceeds to out-of-gamut conversion processing in step S27.

In step S26, the color gamut conversion processing that is described in detail below is executed.

In step S27, the out-of-gamut conversion processing that is described in detail below is executed.

In step S28, the gamma conversion unit 208 converts gamma characteristics of the acquired image data, and outputs the converted image data.

The processing for generating the converted image data is thus completed. The processing procedure is repeatedly executed while the display apparatus 100 displays an image, or while the image data is input.

Figure 8:
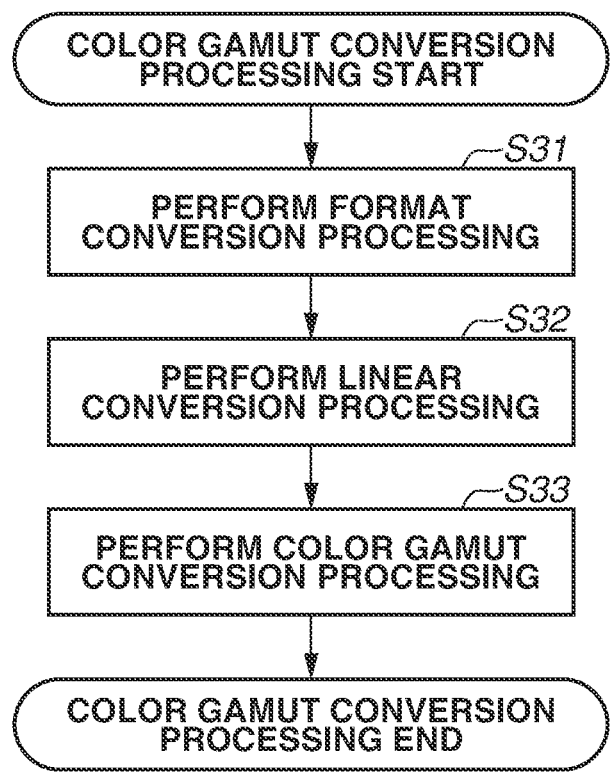
FIG. 8 is a third flowchart illustrating a color gamut conversion processing.

FIG. 8 is a flowchart illustrating the color gamut conversion processing in step S26.

In step S31, the format conversion unit 202 performs format conversion processing for converting the signal format of the acquired image data into the RGB format, and outputs the resultant image data to the linear conversion unit 203.

In step S32, the linear conversion unit 203 performs linear conversion processing for converting the color space of the image data, which has the signal format converted into the RGB format by the format conversion unit 202, into the linear color space, and outputs the resultant image data to the color gamut conversion unit 205 via the switching unit 204.

In step S33, the color gamut conversion unit 205 performs color gamut conversion processing for converting the color gamut of the image data, which has the color space converted into the linear color space by the linear conversion unit 203, into the set color gamut, and outputs the resultant image data.

The color conversion processing is thus completed.

FIG. 9 is a flowchart illustrating the out-of-gamut conversion processing in step S27.

In step S41, the luminance acquisition unit 209 performs luminance level acquisition processing for acquiring the luminance level of each of the pixels, based on the image data which has the signal format converted into the RGB format by the format conversion unit 202. The luminance acquisition unit 209 outputs data representing the luminance level of each of the pixels, to the determination unit 212.

In step S42, the determination unit 212 performs target region determination processing for determining the target region based on the color gamut set by the color gamut setting unit 210, the target range set by the range setting unit 211, and the luminance level of the image data acquired from the luminance acquisition unit 209. The method of determining the target region is executed based on the processing procedure illustrated in FIG. 5.

In step S43, the format conversion unit 202 performs format conversion processing for converting the signal format of the acquired image data into the RGB format, and outputs the resultant image data to the linear conversion unit 203.

In step S44, the linear conversion unit 203 performs linear conversion processing for converting the color space of the image data, which has the signal format converted into the RGB format by the format conversion unit 202, into the linear color space, and outputs the resultant image data to the color conversion unit 206 via the switching unit 204.

In step S45, the color conversion unit 206 performs color conversion processing for converting the image data, which has the color space converted into the linear color space by the linear conversion unit 203, from color to monochrome, and outputs the resultant image data to the out-of-gamut conversion unit 207.

In step S46, the out-of-gamut conversion unit 207 performs out-of-gamut conversion processing for converting the pixel value of the pixel that is included in the region determined as the target region by the determination unit 212 in the image data acquired from the color conversion unit 206, into a value corresponding to the specific color. The out-of-gamut conversion processing is also referred to as coloring processing. The out-of-gamut conversion unit 207 outputs the resultant image data to the gamma conversion unit 208.

The out-of-gamut conversion processing is thus completed.

Figure 10A:
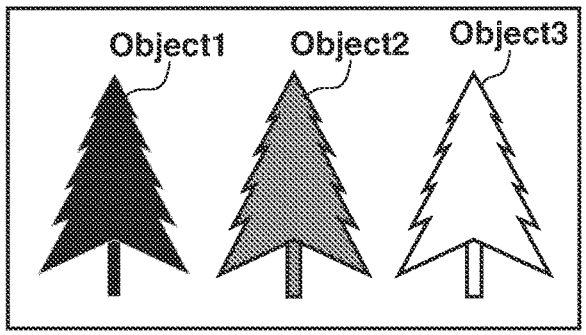
FIGS. 10A to 10F are schematic diagrams each illustrating an effect of the out-of-gamut conversion processing.

FIGS. 10A to 10F are schematic diagrams each illustrating an effect of the out-of-gamut conversion processing according to the present embodiment. FIG. 10A is a schematic diagram illustrating the image data (image signal) input to the display apparatus 100. The color gamut of the image data in FIG. 10A is Rec.2020, and an x value and a y value of each of Objects 1 to 3 are respectively 0.2 and 0.7. In addition, the luminance values Y (Y of YCbCr color space) of Objects 1, 2, and 3 in FIG. 10A are respectively 50, 200, and 400 that are 10-bit integers.

Figure 10B:
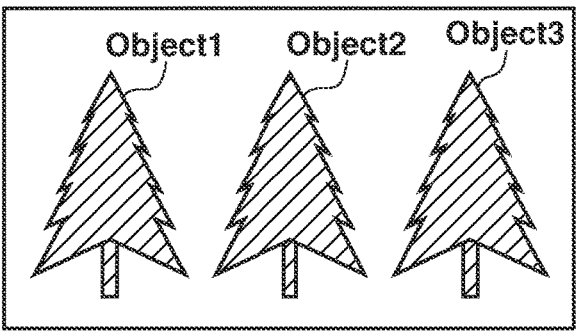

FIG. 10B is a schematic diagram illustrating the converted image data in a case where processing for coloring the region that has the color not included in the color gamut of the image data is performed irrespective of luminance value of the image data, according to the present embodiment. For example, in a case where the determination condition (color gamut) set by the color gamut setting unit 210 is "Rec.709", all of Objects 1 to 3 are determined as out of the color gamut of Rec.709 and as target regions. Accordingly, as illustrated in FIG. 10B, Objects 1 to 3 are all displayed in the specific color (hatched lines in FIG. 10B). The luminance values Y of Objects are however largely different from one another as described above. Object 1 is difficult to be viewed because of low luminance value. If coloring with the specific color is performed on all of Objects, the user recognizes that all Objects each of which has a difference in terms of influence degree are at out-of-gamut regions on which the user wants to focus (to be processed).

Figure 10C:
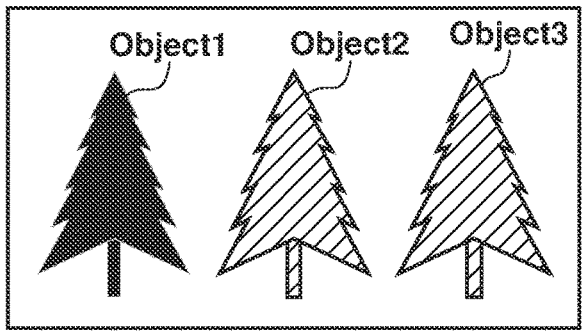

FIG. 10C is a schematic diagram illustrating the converted image data in a case where the range setting unit 211 sets the target range to the range where the luminance value is 100 or more, and the converted image data is generated with the region that has the luminance level included in the target range and has the color not included in the set color gamut as the target region. The determination unit 212 determines the pixel of the image data having the luminance value Y lower than 100, as the within-gamut pixel. In other words, the determination unit 212 determines the out-of-gamut pixel among the pixels having the luminance value Y of 100 or more as the target region. Accordingly, as illustrated in FIG. 10C, only Objects 2 and 3 each having the luminance value of 100 or more are displayed in the specific color (hatched lines in FIG. 10C), and Object 1 is displayed in monochrome.

Figure 10D:
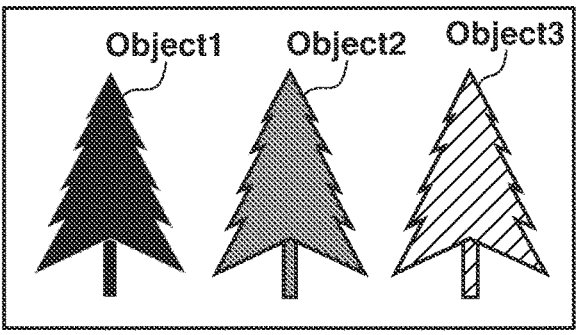

FIG. 10D is a schematic diagram illustrating the converted image data in a case where the range setting unit 211 sets the target range to the range where the luminance value is 300 or more, and the converted image data is generated with the region that has the luminance level included in the target range and has the color not included in the set color gamut as the target region. The determination unit 212 determines the pixel of the image data having the luminance value Y lower than 300, as the within-gamut pixel. In other words, the determination unit 212 determines the out-of-gamut pixel among the pixels having the luminance value Y of 300 or more as the target region. Accordingly, as illustrated in FIG. 10D, only Object 3 having the luminance value of 300 or more is displayed in the specific color (hatched lines in FIG. 10D), and Objects 1 and 2 are displayed in monochrome.

Figure 10E:
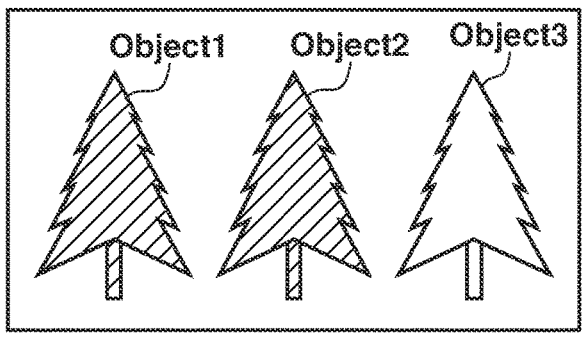

FIG. 10E is a schematic diagram illustrating the converted image data in a case where the range setting unit 211 sets the target range to the range where the luminance value is 300 or less, and the converted image data is generated with the region that has the luminance level included in the target range and has the color not included in the set color gamut as the target region. The determination unit 212 determines the pixel of the image data having the luminance value Y higher than 300, as the within-gamut pixel. In other words, the determination unit 212 determines the out-of-gamut pixel among the pixels having the luminance value Y of 300 or less as the target region. Accordingly, as illustrated in FIG. 10E, only Objects 1 and 2 each having the luminance value of 300 or less are displayed in the specific color (hatched lines in FIG. 10E), and Object 3 is displayed in monochrome.

Figure 10F:
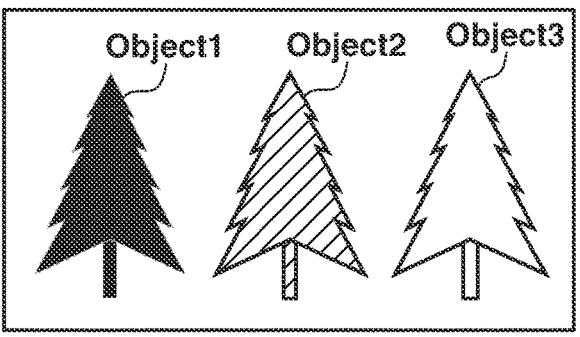

FIG. 10F is a schematic diagram illustrating the converted image data in a case where the range setting unit 211 sets the target range to the range where the luminance value is 100 or more and 300 or less, and the converted image data is generated with the region that has the luminance level included in the target range and has the color not included in the set color gamut as the target region. The determination unit 212 determines the pixel of the image data having the luminance value Y lower than 100 or higher than 300, as the within-gamut pixel. In other words, the determination unit 212 determines the out-of-gamut pixel among the pixels having the luminance value Y of 100 or more and 300 or less as the target region. Accordingly, as illustrated in FIG. 10F, only Object 2 having the luminance value of 100 or more and 300 or less is displayed in the specific color (hatched lines in FIG. 10F), and Objects 1 and 3 are displayed in monochrome.

As described above, the display apparatus according to the first embodiment can limit the luminance range, and display the out-of-gamut region and the other region while distinguishing the regions from each other. As a result, the out-of-gamut region outside the luminance level range on which the user wants to focus can be displayed in monochrome without being subjected to the coloring processing.

This makes it possible to improve visibility of the out-of-gamut region within the luminance range on which the user wants to focus. According to the present embodiment, the region that has the luminance level included in the set target range and has the color not included in the color gamut and the other region are converted by different conversion processing. This enables the user to easily distinguish the out-of-gamut region within the luminance range on which the user wants to focus in the image data.

In particular, a dark part of the image is large in difference between the color gamut, and if noise is superimposed on the image signal, a darker pixel is easily determined as out of the color gamut. Accordingly, there is a case where the pixel that is not out of the color gamut originally is determined as out of the color gamut due to the noise occurred on the image signal. In a case where the coloring processing is performed on the pixel that is out of the color gamut irrespective of the luminance level as with an existing technology, there is an issue that the pixel in the dark region that is not out of the color gamut is subjected to the coloring processing due to the noise superimposed on the image signal, and it is difficult for the user to recognize the out-of-gamut pixel within the high-luminance region on which the user wants to focus.

As described above, for example, the coloring processing is not performed on the out-of-gamut region within the range where the luminance level is equal to or lower than the preset luminance level in the image signal, which makes it possible to reduce influence on user's recognition of the pixel outside the color gamut, on which the user wants to focus, even if the pixel is determined as out of the color gamut due to the noise.

While, according to the first embodiment, the example in which the pixel determined as out of the color gamut is displayed in the specific color has been described, the configuration is not limited thereto. For example, the conversion can be performed in such a manner that the pixel determined as out of the color gamut is displayed by blinking display or pattern display. Further, while, according to the first embodiment, the color of the pixel not determined as out of the color gamut (within-gamut pixel) is converted into monochrome, the pixel may be displayed using a color other than black and white. Various kinds of well-known methods may be adopted as the conversion method as long as the image processing unit 104 generates the converted image data in such a manner that the pixel determined as out of the color gamut and the pixel determined as within the color gamut are displayed to be distinguishable from each other.

The operation modes in which the image processing unit 104 is operable are not limited to the above-described two operation modes. For example, the image processing unit 104 can operate in an operation mode in which, for example, the region that has the color not included in the color gamut is displayed in the specific color irrespective of luminance level of the pixel of the image data and the other region is displayed in monochrome. In this case, the determination unit 212 determines the pixel that has the color not included in the set color gamut, as out of the color gamut, irrespective of whether the luminance level of the image data is included in the target range. In addition, the switching unit 204 outputs the image data acquired from the linear conversion unit 203, to the color conversion unit 206. The out-of-gamut conversion unit 207 performs conversion processing for coloring the pixel determined as out of the color gamut by the determination unit 212 with the specific color, in the image data which has the color converted into monochrome by the color conversion unit 206. The image processing unit 104 converts the color of the pixel that is included in the acquired image and has the color not included in the set color gamut, into the specific color, and converts the color of the other region into monochrome to generate a converted image data and outputs the converted image data.

The processing by the color conversion unit 206 is not limited to the processing for converting the image data acquired from the linear conversion unit 203 from the color image into the monochrome image. For example, the color conversion unit 206 may perform processing for converting the color gamut of the image data into the set color gamut, similar to the color gamut conversion unit 205.

According to the first embodiment, the determination whether the luminance level represented by the Y value of the YCbCr color space, namely, the luminance level represented by the relative luminance is included in the target range is performed. The image processing unit 104 according to a second embodiment determines whether the luminance level represented by absolute luminance is included in the target range. The functional blocks of the display apparatus 100 and the image processing unit 104 according to the second embodiment are similar to those according to the first embodiment.

The image processing unit 104 according to the second embodiment is different from the image processing unit 104 according to the first embodiment in terms of operation of the EOTF setting unit 213 and the functional blocks operating along with the EOTF setting unit 213. The functional blocks that perform operation different from the operation in the first embodiment will be described in detail.

Figure 11:
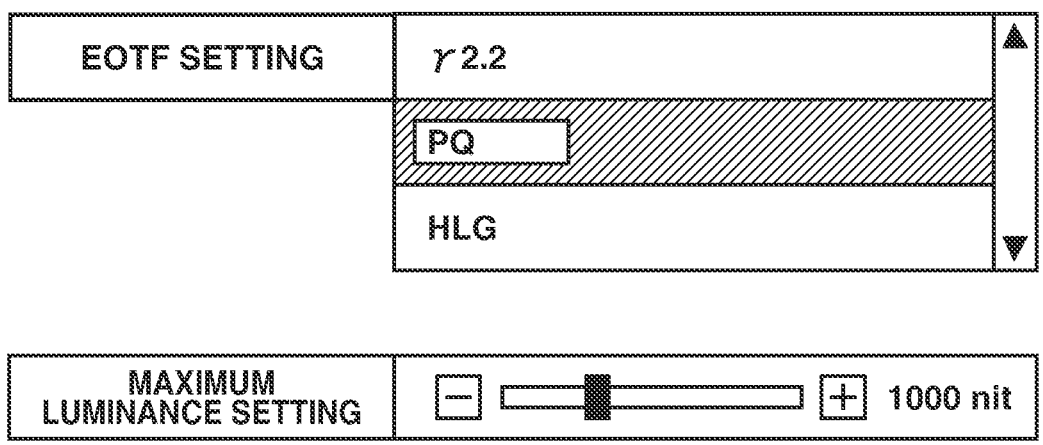
FIG. 11 is a schematic diagram illustrating a GUI used to set an electro optical transfer function (EOTF).

The EOTF setting unit 213 sets a conversion function (EOTF) to convert the color space of the image data into the linear color space and the maximum luminance Lmax of the image data. The maximum luminance Lmax is represented by absolute luminance. The luminance represented by the absolute luminance indicates luminance represented by a unit system representing the luminance (e.g., cd/m² or nit). The EOTF and the maximum luminance Lmax are settable in the menu screen illustrated in FIG. 11 that is displayed on the panel 106, by the user via the I/F unit 101.

The linear conversion unit 203 converts the color space of the image data into the linear color space based on the EOTF and the maximum luminance set by the EOTF setting unit 213. In a case where the EOTF has the PQ characteristics, the linear conversion unit 203 converts the color space of the image data into the linear color space according to the following expression:

$$m1 = \frac{2610}{16384}, \qquad (9)$$

$$m2 = \frac{2523}{4096} \times 128$$

$$c1 = \frac{3424}{4096},$$

$$c2 = \frac{2413}{4096} \times 32,$$

$$c3 = \frac{2392}{4096} \times 32$$

$$Vout = \mathrm{Min}\left(\left(\frac{\mathrm{Max}\left(Vin^{\frac{1}{m2}} - c1, 0\right)}{c2 - c3 \times Vin^{\frac{1}{m2}}}\right)^{\frac{1}{m1}} \times \frac{10000}{L\mathrm{max}}, 1\right)$$

where Vin is a value obtained by normalizing the image data which has the signal format converted into the RGB format by the format conversion unit 202 to 0 to 1.

The luminance acquisition unit 209 converts the image data, which has the color space converted into the linear color space by the linear conversion unit 203, into the luminance value L, based on the maximum luminance Lmax set by the EOTF setting unit 213. The luminance value is calculated according to the following expression:

$$Y = \begin{bmatrix} 0.2631 & 0.6776 & 0.0592 \end{bmatrix} \begin{bmatrix} R \\ G \\ B \end{bmatrix} \quad (10)$$

$$L = Y \times L\text{max}.$$

In Expression 10, 1×3 matrix is a conversion matrix to convert the RGB values of the color gamut of Rec.2020 into the Y value of the XYZ color space. The luminance value represented by the Y value is a relative value. A luminance value L obtained by multiplying the Y value, which is the relative luminance, by the maximum luminance Lmax represented by the absolute luminance is a value represented by the absolute luminance.

Figure 12A:
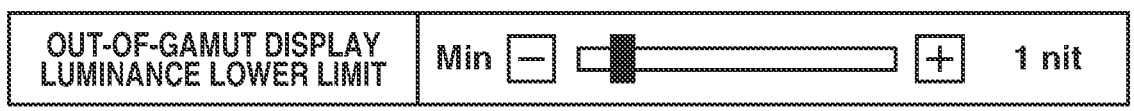
FIGS. 12A to 12C are schematic diagrams each illustrating a GUI used to set a target range.
Figure 12B:
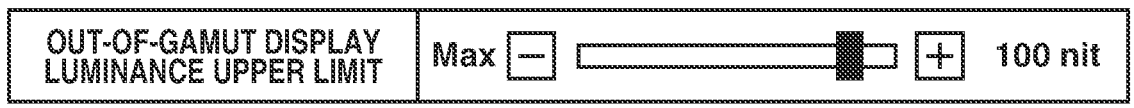
Figure 12C:
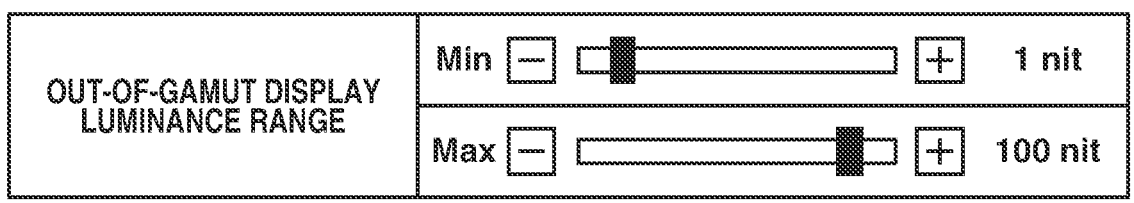

The range setting unit 211 sets the target range of the luminance level to be used by the determination unit 212 to determine the target region, in the absolute luminance. The target range can be set by the user through the I/F unit 101. FIGS. 12A to 12C are schematic diagrams each illustrating a GUI that is used by the user to set the target range. Similar to the GUI illustrated in FIGS. 4A to 4C, the user operates a button on a slide bar to designate at least one of an upper limit and a lower limit of the target range. In the example of FIGS. 12A to 12C, a luminance threshold is designated in the absolute luminance (nit).

FIG. 12A illustrates a GUI in a case where the user designates the lower limit of the target range. In this case, the luminance range where the luminance value is 1 nit or more is the target range. FIG. 12B illustrates a GUI in a case where the user designates the upper limit of the target range. In this case, the luminance range where the luminance value is 100 nit or less is the target range. FIG. 12C illustrates a GUI in a case where the user designates the lower limit and the upper limit of the target range. In this case, the luminance range where the luminance value is 1 nit or more and 100 nit or less is the target range.

The determination unit 212 determines a target region that has the luminance level included in the target range and has the color not included in the set color gamut, in the image data which has the color space converted into the linear color space by the linear conversion unit 203. The determination procedure and the subsequent coloring processing are similar to those according to the first embodiment, and description is therefore omitted.

As described above, in the display apparatus according to the second embodiment, the target range can be designated in the absolute luminance. This is effective in particular to a case where a high dynamic range (HDR) signal having a dynamic range of the luminance which is largely changed depending on a system, is handled.

According to the first embodiment, the determination unit 212 determines whether the luminance level represented by the Y value of the YCbCr color space, namely, the luminance value represented by the relative luminance is included in the target range. According to the second embodiment, the determination unit 212 determines whether the luminance level represented by the absolute luminance is included in the target range.

According to a third embodiment, a description will be given of a case where the out-of-gamut display according to the first embodiment and the out-of-gamut display according to the second embodiment are switched based on the characteristics of the image data. The functional blocks of the display apparatus 100 and the image processing unit 104 according to the third embodiment are similar to those according to the first and second embodiments.

In the third embodiment, the luminance acquisition unit 209 changes the luminance value calculation method, based on the EOTF set by the EOTF setting unit 213.

In a case where an EOTF (e.g., γ2.2) of a standard dynamic range (SDR) signal is set by the EOTF setting unit 213, the luminance acquisition unit 209 calculates the luminance value based on the method according to the first embodiment. In other words, the luminance acquisition unit 209 calculates the Y value of the YCbCr color space from the image data on which conversion of the color space into the linear color space has not been performed by the linear conversion unit 203. In a case where an EOTF (e.g., PQ) of the HDR signal is set by the EOTF setting unit 213, the luminance acquisition unit 209 calculates the luminance value based on the method according to the second embodiment. In other words, the image having the color space converted into the linear color space by the linear conversion unit 203 is converted into the Y value of the XYZ color space, and the Y value is multiplied by the maximum luminance to calculate the absolute luminance.

The range setting unit 211 sets the luminance range (target range) for distinguishing the out-of-gamut region, based on the EOTF set by the EOTF setting unit 213. In the case where the EOTF (e.g., γ2.2) of the SDR signal is set by the EOTF setting unit 213, the relative luminance (e.g., Y value of YCbCr color space) is used to set the target range as illustrated in FIGS. 4A to 4C. In the case where the EOTF (e.g., PQ) of the HDR signal is set by the EOTF setting unit 213, the absolute luminance (nit in case of PQ) is used to set the target range as illustrated in FIGS. 12A to 12C.

With the control performed in the above-described manner, it becomes possible to designate the target range in a unit system of the luminance level corresponding to the type of the set EOTF. In other words, the luminance range where the out-of-gamut region is displayed can be designated by the relative luminance in the case of the SDR signal and by the absolute luminance in the case of the HDR signal. This makes it possible to designate the luminance range suitable for the characteristics of the image data.

The image processing unit 104 according to a fourth embodiment is different from the image processing unit 104 according to the first to third embodiments in that the image processing unit 104 according to the fourth embodiment corrects the set target range based on the feature amount of the image data. The processing for correcting the target range different from the processing according to the first to third embodiments is described. As for the other processing, processing similar to the processing according to the first to third embodiments is executable, and description of the processing is therefore omitted.

The feature amount acquisition unit 214 acquires the feature amount of the image data having the signal format converted into the RGB format by the format conversion unit 202. In this example, the feature amount of the image data is an average picture level (APL) that is an average luminance level of the image data. The APL is an average value of the RGB values of all of the pixels in the image data.

The range setting unit 211 corrects the set target range based on the APL of the image data acquired by the feature amount acquisition unit 214. For example, the range setting unit 211 determines the lower limit Yth according to the following expression:

$$Yth = Y\min \times \frac{APLtar}{APLbase} \quad (11)$$

where Ymin is the lower limit of the target range previously set by the range setting unit 211, APLtar is the APL of the image data, APLbase is a reference value of the APL, and Yth is the lower limit of the corrected target range.

The range setting unit 211 sets the luminance level higher than or equal to the corrected lower limit Yth as the target range, and outputs the target range to the determination unit 212.

As described above, the display apparatus 100 according to the fourth embodiment performs conversion in such a manner that the out-of-gamut region not included in the set color gamut is distinguishable from the other region in the region where the luminance level is included in the target range corresponding to the feature amount of the image data. In a case of an entirely bright image, the lower limit of the luminance level included in the target range is made higher than the lower limit of an entirely dark image. As a result, the luminance level of the region displayed as out of the color gamut is adjusted based on the feature amount of the image data. This makes it possible to improve visibility of the out-of-gamut region in the image.

While the example in which the range setting unit 211 corrects the luminance threshold based on the APL has been described, the other feature amount may be used. Further, while the example in which the luminance threshold is calculated according to Expression 11 has been described, the calculation is not limited thereto. Any other calculation expression to calculate the luminance threshold based on the feature amount of the image data is also applicable.

The image processing unit 104 according to a fifth embodiment is different from the image processing unit 104 according to the first to fourth embodiments in that the image processing unit 104 according to the fifth embodiment corrects the set target range based on brightness of viewing environment (illuminance of environmental light). The processing for correcting the target range different from the processing according to the first to fourth embodiments is described. As for the other processing, processing similar to the processing according to the first to fourth embodiments is executable, and description of the processing is therefore omitted.

The illuminance acquisition unit 215 acquires illuminance from the illuminance sensor 110.

The range setting unit 211 corrects the set target range based on the illuminance acquired by the illuminance acquisition unit 215. For example, the range setting unit 211 determines the lower limit Yth according to the following expression:

$$Yth = Y\min \times \frac{Itar}{Ibase} \quad (12)$$

where Ymin is a lower limit of the target range previously set by the range setting unit 211, Itar is the illuminance acquired by the illuminance acquisition unit 215, Ibase is a reference value of the illuminance, and Yth a lower limit of the corrected target range.

As described above, the display apparatus 100 according to the fifth embodiment performs conversion in such a manner that the out-of-gamut region not included in the set color gamut is distinguishable from the other region in the region where the luminance level is included in the target range corresponding to the illuminance of the environmental light. For example, in a case where the illuminance of the environmental light is high, the out-of-gamut region of the pixel with high luminance is displayed because visibility of the dark part is reduced. In a case where the illuminance of the environmental light is low, the out-of-gamut region of the pixel with low luminance is also displayed because visibility of the dark part is increased. This makes it possible to reflect difference of visibility of the dark part depending on viewing environment, on the display of the out-of-gamut region.

While the example in which the range setting unit 211 calculates the luminance threshold according to Expression 12 has been described, the calculation is not limited thereto. Any other calculation expression to calculate the luminance threshold based on the illuminance is applicable.

According to the present invention, the region that has the luminance level included in the set target range and has the color not included in the color gamut and the other region are converted by different conversion processing. This allows the user to easily distinguish the out-of-gamut region within the luminance range on which the user wants to focus in the image data.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2018-044354, filed Mar. 12, 2018, which is hereby incorporated by reference herein in its entirety.

What is claimed is:

1. An image processing apparatus for visualizing an out-of-gamut region of an image, the apparatus comprising:
   at least one processor and/or at least one circuit to perform operations of:
   setting a target range of a luminance level; and
   generating a processed image by converting a color of a first region of the image into a predetermined color, the first region having a luminance level included in the target range and having a color not included in a target color gamut, and converting a second region of the image into a monochrome image without the predetermined color, the second region of the image including a region having a luminance level not included in the target range and having a color not included in the target color gamut, and a region having a color included in the target color gamut,
   wherein the target range is a range of a luminance level being equal to or higher than a luminance threshold that is set based on a user instruction such that a region of the image having a luminance level being lower than the luminance threshold is not converted into the predetermined color.

2. The image processing apparatus according to claim 1, wherein the at least one processor and/or the at least one circuit perform further operations of:
   displaying a graphical user interface (GUI) on a display for setting the target range;
   receiving a user input based on the GUI; and
   setting the target range based on the received user input.

3. The image processing apparatus according to claim 2, wherein a lower limit of the target range is set based on the received user input.

4. The image processing apparatus according to claim 2, wherein an upper limit of the target range is set based on the received user input.

5. The image processing apparatus according to claim 1, wherein the at least one processor and/or the at least one circuit perform further operations of setting the target color gamut based on an instruction by a user.

6. The image processing apparatus according to claim 1, wherein the at least one processor and/or the at least one circuit perform further operations of setting a color gamut selected by the user among a plurality of color gamuts including at least one of Rec.2020 and Rec.709 as the target color gamut.

7. The image processing apparatus according to claim 1, wherein the generating selects and executes one of a plurality of operation modes including a first operation mode in which the processed image is generated and a second operation mode in which a color of the second region having the color not included in the target color gamut of the image is converted into a color included in the target color gamut to generate an image.

8. The image processing apparatus according to claim 1, wherein the at least one processor and/or the at least one circuit perform further operations of:
   setting gradation characteristics of the image,
   wherein, in a case where perceptual quantization (PQ) characteristics defined by International Telecommunication Union-Radiocommunication Sector (ITU-R) BT.2100 are set, the target range is set with an absolute luminance.

9. The image processing apparatus according to claim 1, wherein the at least one processor and/or the at least one circuit perform further operations of causing a display to display an image based on the processed image.

10. The image processing apparatus according to claim 9, wherein the at least one processor and/or the at least one circuit perform further operations of acquiring an output value relating to illuminance of environmental light around the display from a sensor,
    wherein the target range is set based on the output value.

11. A method of visualizing an out-of-gamut region of an image, the method comprising:
    performing a first setting process to set a target range of a luminance level; and
    generating a processed image by converting a first region of the image into a predetermined color, the first region having a luminance level included in the target range and having a color not included in a target color gamut, and converting a second region of the image into a monochrome image without the predetermined color, the second region of the image including a region having a luminance level not included in the target range and having a color not included in the target color gamut, and a region having a color included in the target color gamut,
    wherein the target range is a range of a luminance level being equal to or higher than a luminance threshold that is set based on a user instruction such that a region of the image having a luminance level being lower than the luminance threshold is not converted into the predetermined color.

12. The method according to claim 11, further comprising:
    displaying a graphical user interface (GUI) on a display for setting the target range;
    receiving a user input based on the GUI; and
    setting the target range is set based on the received user input in the first setting process.

13. The method of controlling the image processing apparatus according to claim 12, wherein a lower limit of the target range is set based on the received user input in the first setting process.

14. The method according to claim 11, further comprising performing a second setting process to set the target color gamut based on an instruction by a user.

15. The method according to claim 14, wherein among a plurality of color gamuts including at least one of Rec.2020 and Rec.709, a color gamut selected by a user is set as the target color gamut in the second setting process.

16. The method according to claim 11, further comprising controlling a display to display an image based on the processed image.

17. The method according to claim 16, wherein an output value relating to illuminance of environmental light around the display is acquired from a sensor, and the target range is set based on the output value in the first setting process.

18. A non-transitory computer-readable storage medium storing a program that is readable and executable by a processor, the program causing the processor to execute following functions of an image processing apparatus, the functions comprising:
    performing a first setting process to set a target range of a luminance level; and generating a processed image by converting a color of a first region of an image into a predetermined color, the first region having a luminance level included in the target range and having a color not included in a target color gamut, and converting a second region of the image into a monochrome image without the predetermined color, the second region of the image including a region having a luminance level not included in the target range and having a color not included in the target color gamut, and a region having a color included in the target color gamut, wherein the target range is a range of a luminance level being equal to or higher than a luminance threshold that is set based on a user instruction such that a region of the image having a luminance level being lower than the luminance threshold is not converted into the predetermined color.

* * * * *